United States Patent [19]

Clark, III

[11] 4,153,757

[45] May 8, 1979

[54] METHOD AND APPARATUS FOR GENERATING ELECTRICITY

[76] Inventor: William T. Clark, III, 6 Davis Blvd., New Orleans, La. 70121

[21] Appl. No.: 835,148

[22] Filed: Sep. 20, 1977

Related U.S. Application Data

[63] Continuation of Ser. No. 662,702, Mar. 1, 1976, abandoned, which is a continuation-in-part of Ser. No. 143,961, May 17, 1971, abandoned, which is a continuation-in-part of Ser. No. 726,298, May 3, 1968, abandoned.

[51] Int. Cl.$^2$ ............................................. H01M 2/00
[52] U.S. Cl. ......................................... 429/47; 429/68
[58] Field of Search ............................. 429/47, 67–70, 429/120; 310/11

[56] References Cited

PUBLICATIONS

Scientific American, Apr. 23, 1910, p. 334.
Geomagnetism, Chapman et al., 1940, pp. 445–448.
Magnetohydrodynamic Power Generation, Electronics & Power, Aug. 1964, pp. 258–263.

Primary Examiner—Charles F. LeFevour
Attorney, Agent, or Firm—Littlepage, Quaintance, Murphy, Richardson and Webner

[57] ABSTRACT

Two spaced electrodes having a load in an external circuit connected between them are disposed in an electrically conductive liquid, and energy is imparted to the liquid in such manner that energized free electrons in the liquid excite free electrons which flow into one electrode to a greater degree than in the other electrode, thereby causing electric current to flow in the external circuit through the load.

9 Claims, 6 Drawing Figures

INVENTOR
WILLIAM T. CLARK III

BY *James H. Littlepage*

ATTORNEY

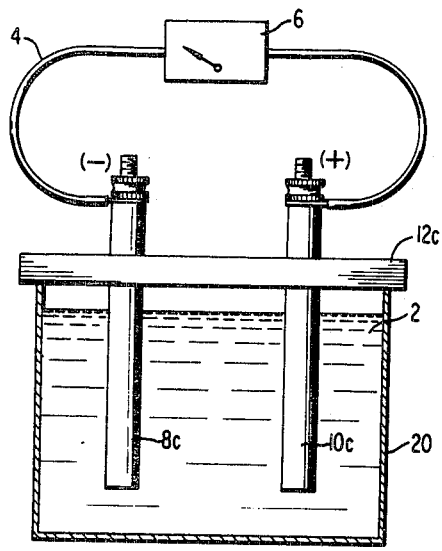
FIG.4
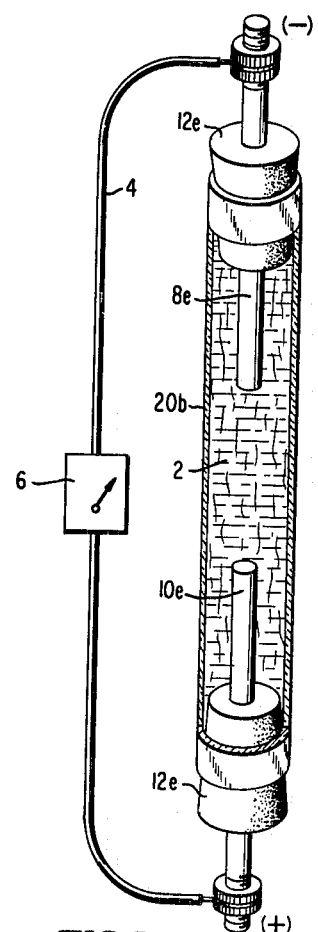
FIG.6
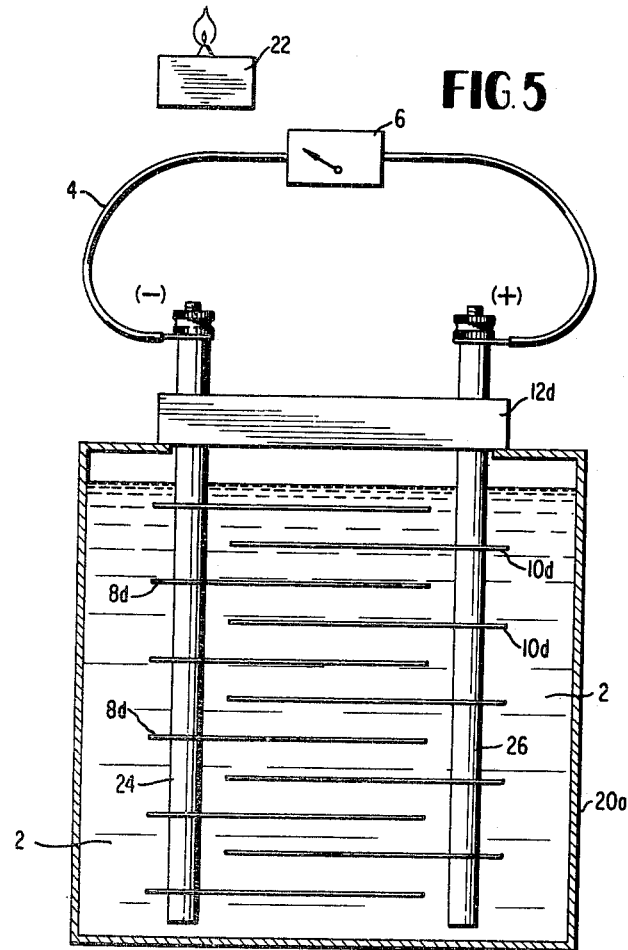
FIG.5
INVENTOR
WILLIAM T. CLARK III
BY 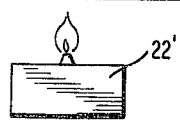
ATTORNEY

METHOD AND APPARATUS FOR GENERATING ELECTRICITY

RELATED APPLICATIONS

This is a continuation of Ser. No. 662,702, filed Mar. 1, 1976 now abandoned, which was a continuation-in-part of Ser. No. 143,961, filed May 17, 1971 now abandoned, which, in turn, was a continuation-in-part of Ser. No. 726,298, filed May 3, 1968, now abandoned.

BACKGROUND OF INVENTION

1. Field of Invention

The invention falls within the class of batteries, miscellaneous.

2. Prior Art

Acheson No. 375,243 discloses a thermo-electric generator wherein two spaced electrodes are disposed in a liquid and one electrode is directly heated, and the liquid is caused to flow so as to avoid accumulation of gases at the electrode surfaces. Free electrons in the metal of the heated electrode cause current to flow in an external circuit. However, unlike in the subject invention wherein free electrons are caused to flow from the liquid into one electrode more than the other, Acheson, by directly heating one electrode, causes free electrons to flow out of the heated electrode into the liquid and thus inhibit rather than enhance establishment of a current in the external circuit.

Case No. 344,345 discloses the heating of two spaced electrodes disposed in a liquid which, when heated, reacts chemically with one of the electrodes. The use of heat to promote chemical reaction is distinguished from the use of heat merely to impart energy to the free electrons in a conductive liquid, as is here involved.

Gilbert U.S. Pat. No. 1,379,909 discloses the heating of a bar, one end of which is drawn through a die. This results in a thermoelectric junction which produces measurable current in an external circuit. In contrast, the subject method does not utilize a junction.

The collection of electric current from an energized electrically conductive liquid in the absence of essential electrochemical change and in the absence of a thermoelectric junction was well-established by Lord Kelvin. Metal plates immersed in flowing sea water were used to create a magneto-hydrodynamic generator. Unlike the present subject invention, however, the metal plates were symmetrically perpendicular to the direction of flow and were carefully placed with respect to a magnetic field which differentially deflected electrons from the flowing stream.

By contrast, the subject invention eliminates the need for and does not employ a magnetic field. Further, among other differences, when the stream is flowing in this invention, the electrodes are assymmetrically oriented with respect to the source of energy.

Even though the metal plates immersed in salty sea water would appear to make a chemical "sea battery," Lord Kelvin's device was not a chemical battery. Lord Kelvin observed that such variables as placement of the magnetic field and the direction of water flow affected the current output of his device. Such variables do not affect battery operation.

Likewise, the electricity generated by the present subject invention is not due to electrochemical change and, as in Lord Kelvin's device, the variables which determine current output in the present subject invention do not determine current output in chemical batteries. Such factors as direction of flow of the electrically conductive liquid and orientation of the electrodes in the manner described do not determine the output of chemical batteries.

Scientific America, Apr. 23, 1910, p. 334, discloses a current generating device wherein electrodes are disposed on opposite sides of porous barrier which separates ions in liquid flowing through the barrier and, hence, a constant net free electron concentration is not maintained in the liquid.

"Geomagnetism" by Chapman and Bartels, Oxford University Press, 1946, pp. 445–448, and "Magnetohydronamic Power Generation, A Status Report, Electronics & Power", August, 1964 disclose spaced electrodes disposed in water which flows through the earth's magnetic field so as to induce an electrical current. The flowing sea water is the source of energy, but the ability of one electrode to respond to free electrons more than the other depends upon the magnetic field of the earth.

OBJECTS

The primary object of the invention is to provide a method for generating electricity, utilizing two solid electrodes of conductive material immersed in a conductive liquid, wherein energy is imparted to the liquid so as to agitate or excite free electrons therein, and to cause more of the free electrons to flow into one electrode than into the other. This may be accomplished by several modes, all emobdying the same basic concept.

A more specific object, relative to one mode of operation, is to provide for the disposition of two electrodes, having an external load circuit connected between them, in a stream of flowing conductive liquid, with one electrode upstream of the other, i.e., closer to the source of energy, whereby the upstream electrode is exposed to more free electrons in the liquid than the downstream electrode. More free electrons in the liquid reach the upstream electrode first. While variations in the amount of current flow in the external circuit may be obtained by making the upstream electrode the larger one, or by making it of greater electrical conductivity than the downstream one, measurable current, useful for operating low power devices, can be generated where the electrodes are of the same size, shape and material.

According to another mode, an object is to generate electric current by means of two electrodes immersed in a conductive liquid, wherein energy is imparted to the liquid by mechanically moving one electrode, i.e., by vibrating or oscillating it, thereby stimulating or moving more free electrons in the liquid in the vicinity of the moving electrode than in the vicinity of the other.

Still another object is to generate electrical current in a load circuit between two electrodes of different properties of electrical conductivity immersed in a conductive liquid, wherein energy is imparted to the liquid in the form of heat, and wherein more electron activity occurs in the electrode which is more electrically conductive.

These and other objects will be apparent from the following specification and drawings, in which:

FIG. 4 illustrates still another mode of performing the method, wherein electrons are concentrated adjacent one electrode more than at the other electrode by means of heat applied to the conductive fluid; and, FIG. 5 illustrates a variation of the FIG. 4 mode.

FIG. 6 illustrates still another embodiment in which the electrodes are of different metals.

Throughout the following examples, there are shown, in each instance, a conductive liquid 2, an external load circuit 4 having a milliammeter or microammeter 6. Polarity of the electrodes is as indicated.

Figure 1:
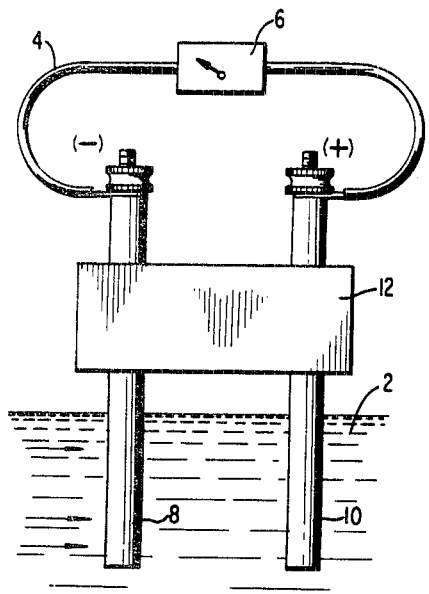
FIG. 1 illustrates one mode of performing the method utilizing a flowing conductive liquid.

Referring first to FIG. 1, electrodes 8 and 10 are supported in spaced relation to one another by an electrically insulating block 12. The electrodes were ¼ inch in diameter and 5 inches long. Conductive liquid 2 is a stream of water supplied by a household water faucet, the water having sufficient impurities to render it conductive, and flows at the slowest rate possible consistent with a steady stream. Electrode 8 is upstream. Both electrodes 8 and 10 are of the same size and shape, and are immersed to a depth of about ½ inch in the water. Where electrode 8 was copper and electrode 10 carbon, the measured current in load circuit 4 was 17 microamperes. Where both electrodes were brass, the measured current in load circuit 4 was 25 microamperes. Where electrode 8 was aluminum and electrode 10 brass, the measured current in load circuit 4 was 43 microamperes.

Figure 2:
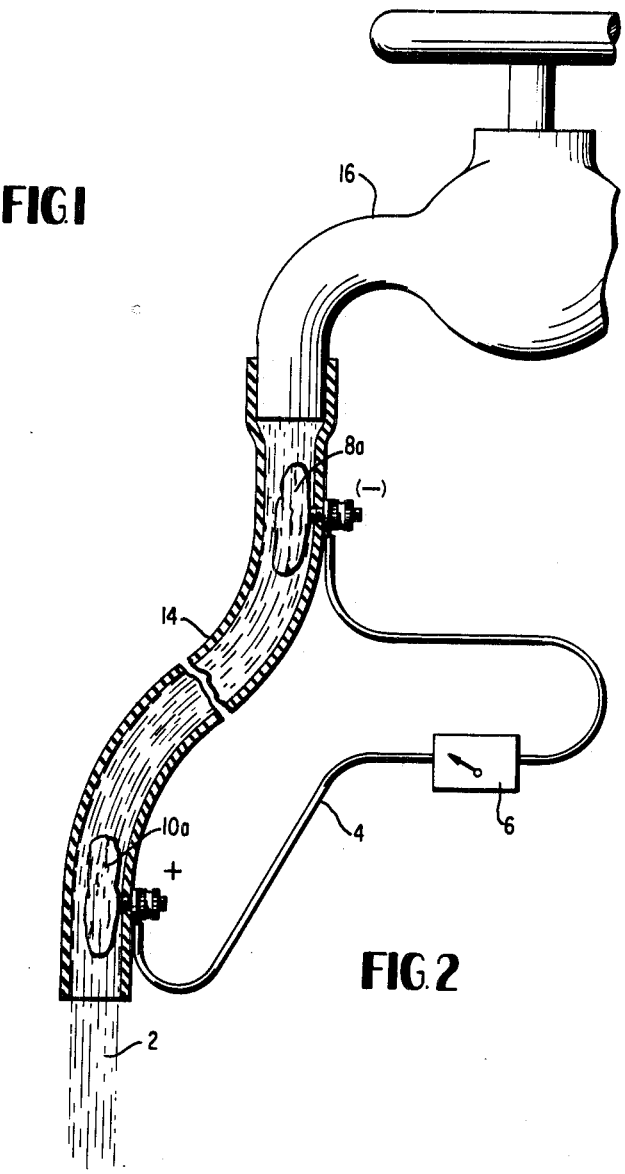
FIG. 2 illustrates a variation of the FIG. 1 mode.

In the FIG. 2 example, electrodes 8a and 10a were both constructed of shredded aluminum foil and disposed in a rubber hose 14 connected to a domestic cold water faucet 16. In this case the measured current in external load circuit 4 was 30 microamperes.

Figure 3:
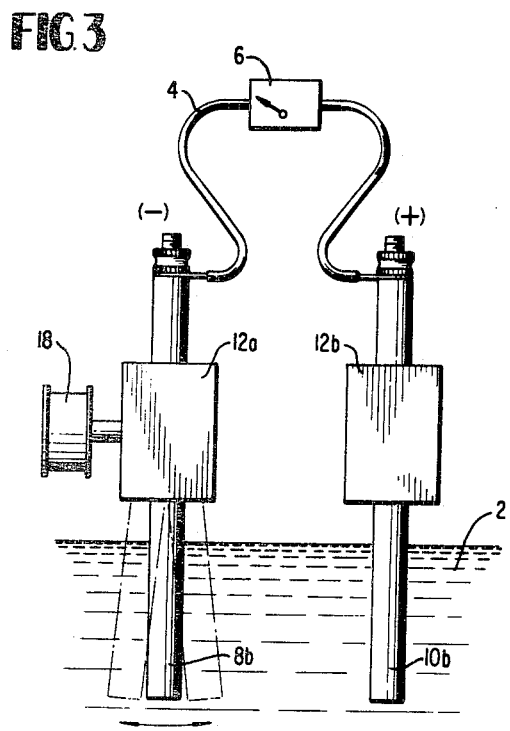
FIG. 3 illustrates another mode of performing the method, wherein mechanical energy is imparted to the conductive liquid adjacent one electrode.

In the FIG. 3 example, electrodes 8b and 10b were of the same size and shape as electrodes 8 and 10 of the FIG. 1 example, both were made of brass, and both were immersed in the conductive liquid 2, which was cold tap water, to a depth of about ½ inch. Electrodes 8b and 10b were individually supported by electrically insulating blocks 12a and 12b. Electrode 10b was held stationary in the conductive liquid, which also was still, and electrode 8b was set into vibratory motion at the rate of four cycles per second by means of a solenoid 18. This yielded 14 microamperes in the external load circuit 4. No current was produced when both electrodes were motionless.

In the FIG. 4 example, electrodes 8c and 10c were of the same size and diameter as in FIGS. 1 and 3, and supported by an electrically insulating cover 12c to an immersion depth of about three inches in conductive liquid 2, which was tap water contained in a vessel 20. In this case the liquid was heated by an external source of heat 22 to approximately 200° F. When electrode 8c was aluminum and electrode 10c was brass, the current flow in external load circuit 4 was 1.4 milliamperes. When both electrodes were of brass, no current was produced.

FIG. 5 illustrates a practical modification of the FIG. 4 example. Here, sets of electrodes 8d and electrodes 10d were made of 20 gauge sheet metal 3½ inches long and 1 inch wide, the sets of electrodes interdigitating with one another and being supported on common conductors in a vessel 20a, the common conductors being supported by an electrically insulating block 12d. The conductive liquid was tap water, as in the previous examples, and was heated to about 200° F. by a source of external heat, not shown. The same effect can be achieved by imparting the same amount of energy to the water by other means as agitation. Electrodes 8d were of aluminum and electrode 10d were of brass. The current yield in external load circuit was 60 milliamperes, which was more than enough to operate a seven transistor radio at full volume.

In the FIG. 6 example, electrodes 8e and 10e were made of aluminum and brass, respectively, each of the same size and shape as in the examples of FIGS. 1, 3 and 4. The electrodes were mechanically supported by insulating stoppers 12e in a glass tube 20b which was ½ inch in diameter and 3½ inches long. The conductive liquid 2 was tap water, at room temperature, about 73° F. The current yield in external load circuit was 20 microamperes. When the water was replaced by an electrically conductive jelly (i.e., gelatin), the device continued to operate and produce 15 microamperes in external load circuit 4.

In all embodiments, one of two electrodes, disposed in a conductive liquid to which energy is imparted so as to excite free electrons therein, is made to respond to more free electrons than the other one, either by locating closer to the source of energy or by virtue of the fact that it is made of more electrically conductive material, or because it is agitated so as to contact more free electrons than the other.

In all examples, the net free electron concentration, i.e., free electron population in the conductive fluid, is maintained substantially constant, as contrasted with batteries relying upon significant electrochemical change between the electrodes. Also, in all examples, the flow path for electrons and liquid between the electrodes is substantially free.

Because electrochemical change is not essential to the operation of this invention, the elements of this invention do not degenerate and decompose into waste products. Consequently, there is not particulate or chemical pollution of the electrically conductive liquid.

Furthermore, since a magnetic field is not essential to the operation of the apparatus or method, the orientation of the electrodes with respect to the earth's magnetic field is of no consequence.

I claim:

1. Apparatus for generating electrical current in a load circuit, comprising
   a conductive fluid having free electrons therein,
   a pair of spaced electrodes disposed in said conductive fluid,
   an external load circuit connecting said electrodes, the conductive fluid between said electrodes providing a substantially free path therethrough for said free electrons and said conductive fluid between said electrodes, which flow path is of substantially uniform electrical impedance from one electrode to the other and which liquid and electrodes are characterized by the fact that they maintain in said liquid a substantially constant net free electron concentration in said liquid, and said apparatus being characterized by an ability of one of said electrodes to respond to free electrons more readily than the other in the absence of an essential magnetic field and absent an essential electrochemical change or an essential thermo-electric junction effect which provides current in the load circuit,
   and energy source means, other than the relative motion of an essential magnetic field, for exciting said free electrons in said liquid.

2. Apparatus as claimed in claim 1, the ability of one of said electrodes to respond to free electrons more readily than another resulting from the disposition of said one electrode closer to the energy source means than the other.

3. Apparatus as claimed in claim 2, said energy source means comprising means for causing said liquid to flow along said electron path from said one electrode to the other.

4. Apparatus as claimed in claim 1, the ability of one of said electrodes to respond to free electrons more than the other resulting from the fact that said one electrode is formed of a metal which is more electrically conductive than the other.

5. Apparatus for generating electrical current in a load circuit, comprising a conductive fluid having free electrons therein, a pair of spaced electrodes disposed is said conductive fluid, an external load circuit connecting said electrodes, the conductive fluid between said electrodes providing a substantially free path therethrough for said free electrons and said conductive fluid between said electrodes, which flow path is of substantially uniform electrical impedance from one electrode to the other and which liquid and electrodes are characterized by the fact that they maintain in said liquid a substantially constant net free electron concentration in said liquid, and said apparatus being characterized by an ability of one of said electrodes to respond to free electrons more readily than the other in the absence of an essential magnetic field and absent an essential electrochemical change or an essential thermo-electric junction effect which provides current in the load circuit, and energy source means, other than the relative motion of an essential magnetic field, for exciting said free electrons in said liquid, said energy source means comprising means for agitating said liquid in the vicinity of said one electrode more than in the corresponding vicinity of the other.

6. Apparatus as claimed in claim 5, the means for agitating said liquid comprising means for applying mechanical force to said liquid via said one electrode.

7. Apparatus for generating electrical current in a load circuit, comprising a conductive fluid having free electrons therein, a pair of spaced electrodes disposed in said conductive fluid, an external load circuit connecting said electrodes, the conductive fluid between said electrodes providing a substantially free path therethrough for said free electrons and said conductive fluid between said electrodes, which flow path is of substantially uniform electrical impedance from one electrode to the other and which liquid and electrodes are characterized by the fact that they maintain in said liquid a substantially constant net free electron concentration in said liquid, and said apparatus being characterized by an ability of one of said electrodes to respond to free electrons more readily than the other in the absence of an essential magnetic field and absent an essential electrochemical change or an essential thermoelectric junction effect which provides current in the load circuit, and energy source means, other than the relative motion of an essential magnetic field, for exciting said free electrons is said liquid, the ability of one of said electrodes to respond to free electrons more than the other resulting from the fact that said one electrode is formed of a metal which is more electrically conductive than the other, the source of energy for exciting the free electrons in said liquid comprising a source of heat applied thereto.

8. The method of generating electrical current in a load circuit which comprises, disposing in a conductive liquid containing free electrons two spaced electrodes having an external load circuit connected therebetween, imparting energy to the conductive fluid in such manner as to excite free electrons therein, collecting more free electrons on one of said electrodes than on the other, in the absence of essential electrochemical change which provides current in the load circuit between said electrodes and said conductive liquid and in the absence of an essential magnetic field or thermoelectric junction effect between said electrodes while maintaining a substantially constant net free electron concentration in the conductive fluid, and utilizing the generated electrical current in the load circuit, wherein the energy is imparted to said conductive liquid by agitating said one electrode.

9. The method of generating electrical current in a load circuit which comprises, disposing in a conductive liquid containing free electrons two spaced electrodes having an external load circuit connected therebetween, imparting energy to the conductive fluid in such manner as to excite free electrons therein, collecting more free electrons on one of said electrodes than on the other, in the absence of essential electrochemical change which provides current in the load circuit between said electrodes and said conductive liquid and in the absence of an essential magnetic field or thermoelectric junction effect between said electrodes while maintaining a substantially constant net free electron concentration in the conductive fluid, and utilizing the generated electrical current in the load circuit, wherein the energy is imparted to the conductive liquid in the form of heat, and wherein said one electrode is of a material characterized by greater electrical conductivity than the other electrode.

* * * * *